US009176235B2

(12) United States Patent
Nichols

(10) Patent No.: US 9,176,235 B2
(45) Date of Patent: Nov. 3, 2015

(54) SYSTEM AND METHOD FOR PRESENTING TOPOGRAPHICAL DATA FOR AN EARTHMOVING OPERATION

(75) Inventor: Mark Edward Nichols, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 1010 days.

(21) Appl. No.: 12/101,523

(22) Filed: Apr. 11, 2008

(65) Prior Publication Data

US 2009/0256860 A1 Oct. 15, 2009

(51) Int. Cl.
*G06T 19/00* (2011.01)
*G01S 19/40* (2010.01)

(52) U.S. Cl.
CPC *G01S 19/40* (2013.01); *G06T 19/00* (2013.01)

(58) Field of Classification Search
USPC .............. 345/419, 629, 632; 701/50; 702/150
See application file for complete search history.

(56) References Cited

U.S. PATENT DOCUMENTS

| 5,631,658 A | 5/1997 | Gudat et al. |
| 5,646,844 A | 7/1997 | Gudat et al. |
| 6,047,227 A | 4/2000 | Henderson et al. |
| 6,094,625 A * | 7/2000 | Ralston .......................... 702/150 |
| 2005/0283294 A1* | 12/2005 | Lehman et al. .................. 701/50 |
| 2009/0219199 A1* | 9/2009 | Borchert et al. .............. 345/419 |

* cited by examiner

*Primary Examiner* — Chante Harrison
(74) *Attorney, Agent, or Firm* — K&L Gates LLP

(57) ABSTRACT

System and method for presenting a visual image of a work site for an earthmoving machine. In one embodiment, target design data for the work site may be received. A spatial location and orientation for an earthmoving machine operating in relation to the work site may also be received. A visual image of at least a portion of the work site may be received from an imaging device mounted to the earthmoving machine. A visual image of the portion of the work site may be displayed with a subset of the design data overlaying the visual image, wherein the subset of the design data relates to the portion of the work site.

18 Claims, 5 Drawing Sheets

SYSTEM AND METHOD FOR PRESENTING TOPOGRAPHICAL DATA FOR AN EARTHMOVING OPERATION

FIELD OF THE INVENTION

The present invention relates in general to a method and apparatus for presenting topographical data and more particularly to presenting a target design surface and a visual image of a work site to an operator of an earthmoving machine.

BACKGROUND

Earthmoving operations typically employ various types of earthmoving machines to transform the topographical characteristics of a work site. For example, an excavator may be employed to dig a trench. Similarly, a bulldozer may be employed for clearing or pushing material to a desired grade. Typically, a marker, such as a stake or flag, can be placed to mark a particular location. However, conventional markers may be limited in their ability to notify an operator of the earthmoving machine of an area of interest. These conventional markers provide little more than mark a particular location. For some earthmoving operations, additional information may be required to determine if earth is to be moved to, or removed from, the location the marker represents. Further, performing an earthmoving operation at the location of a conventional marker can remove, and/or conceal, the marker. As such, conventional markers may not be suitable for certain earthmoving operations.

Another disadvantage of conventional earthmoving operations may be complications associated with viewing a reference mark and/or a work site from an earthmoving machine. For example, in certain earthmoving machines, an operator may not have a complete view of a work site from a cab of the earthmoving machine. Similarly, an operator may not be able to identify a reference marker from the cab of certain earthmoving machines. Thus, operation of the earthmoving machine may be difficult. Further, operation of the earthmoving machine may further be complicated by the size of a particular earthmoving machine and/or obstacles in the vicinity.

While conventional methods of earth moving operations can utilize flags and stakes as markers, such conventional markers may not satisfy operation requirements of certain earthmoving machines.

BRIEF SUMMARY OF THE INVENTION

Disclosed and claimed herein are a system and method for presenting a visual image of a work site for an earthmoving operation. In one embodiment, target design data for the work site may be received. A spatial location and orientation may be received for the earthmoving machine operating in relation to the work site. Additionally, a visual image of at least a portion of the work site may be received from an imaging device mounted to the earthmoving machine. A visual image of the portion of the work site is displayed with a subset of the target design data overlaying the visual image, wherein the subset of the target design data relates to the portion of the work site.

Other aspects, features, and techniques of the invention will be apparent to one skilled in the relevant art in view of the following detailed description of the invention.

DETAILED DESCRIPTION OF EXEMPLARY EMBODIMENTS

One aspect of the present invention is directed to providing data to an operator of an earthmoving machine for an earthmoving operation. In one embodiment, a controller may be configured to receive data corresponding to the spatial location and orientation of an earthmoving machine. According to another embodiment, the controller may be configured to receive target design data and imaging data corresponding to the work site. In one embodiment, target design data may relate to topographical data associated with the work site. The controller may further be configured to display a visual image of the portion of the work site and a target design surface profile overlaying the visual image. In one embodiment, the target design surface profile may be transparently overlaid, translucently overlaid, etc. In that fashion, the controller can provide a desired grade, elevation, or fill information to an operator of an earthmoving machine as one or more of a plan, profile and 3D model representation.

According to another aspect of the invention, a process is provided for presenting a target design surface profile to an operator of an earthmoving machine. The process may include receiving design surface data for a work site and a position and orientation of an earthmoving machine. The process may further include receiving a visual image of a portion of the work site. According to another embodiment, the process may include superimposing a target design surface profile on the visual image of the work site.

Another aspect of the invention relates to a system which may be provided for presenting a real time visual display of a work site to an operator of an earthmoving machine. In one embodiment, the system may include a controller mounted in an earthmoving machine. The system may further include a plurality of reference markers. According to another embodiment, the system may include a control center in communication with the earthmoving machine, the control center configured to collect the orientation and position of the earthmoving machine and reference markers to provide a generate topographical model of a work site. The controller may communicate with elements of the system to provide a real time display of the work site including a target design surface.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Figure 1:
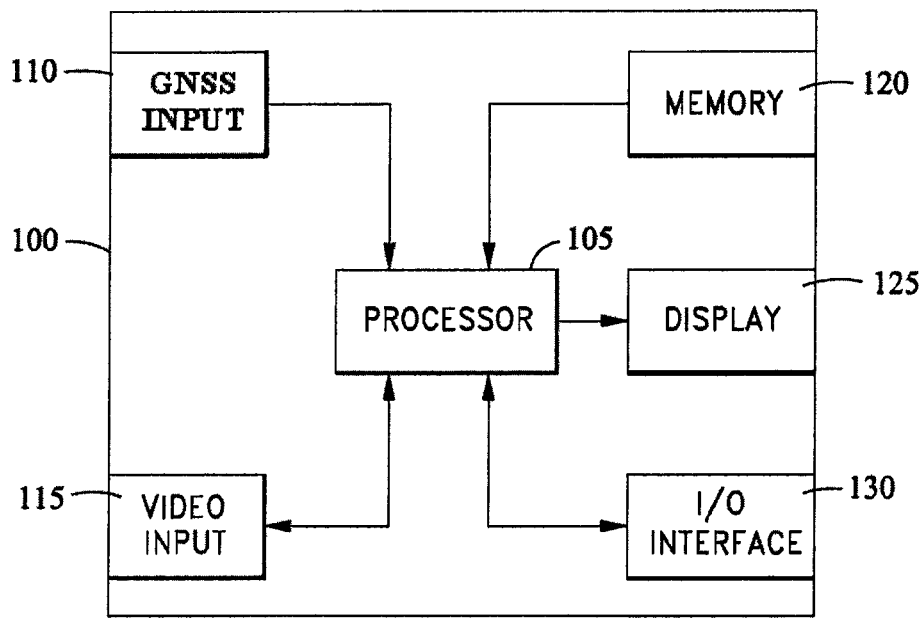
FIG. 1 depicts a simplified block diagram of a controller according to one or more embodiments of the invention.

Referring now to the drawings, FIG. 1 illustrates a simplified block diagram of a controller according to one or more embodiments of the invention. According to one embodiment of the invention, controller 100 may be configured to provide design data to an operator of an earthmoving machine. As used herein, design data may relate to a mapping of features within a work site including a position and/or elevation of features in the work site. It may also be appreciated that design data may include a target design surface for at least a portion of the worksite, wherein the target design surface relates to a desired grade, elevation or representation of the work site. According to another embodiment, design data may relate to a desired cut and/or fill for material. For example, design data may indicate a height or depth of stones to be placed in a particular location. As shown in FIG. 1, controller 100 includes a processor 105 coupled to a GNSS input 110, visual input 115, memory 120, display 125 and input/output (I/O) interface 130. GNSS input 110 may be configured to receive data corresponding to a spatial location and/or orientation of an earthmoving machine. In one embodiment, controller 100 can receive at least one of global navigation satellite system (GNSS) data, global positioning system (GPS) data and geo-spatial positioning data in general via GNSS input 110. According to another embodiment, controller 100 can receive ground based radio position data, 3D positioning system generated by a total station and/or any type of 3D positioning data in general. Visual input 115 of controller 100 may be coupled to an imaging source such as a digital still camera, video camera or video device in general. As such, visual input 115 may be usable to receive imaging data from an imaging device. According to another embodiment, input/output (I/O) interface 130 may be usable to receive design and/or updated topographical data for a work site via a wired or wireless link. Processor 105 may be configured to provide one or more output signals via I/O interface 130 such that received visual data from visual input 115 and topographical data received from I/O interface 130 may presented via display 125. It may also be appreciated that data received by processor 105 may be stored in memory 120. Memory 120 may be one of a ROM and RAM memory. According to another embodiment, processor 105 can be any type of processor such as a microprocessor, field programmable gate array (FPGA) and/or application specific integrated circuit (ASIC).

Figure 2:
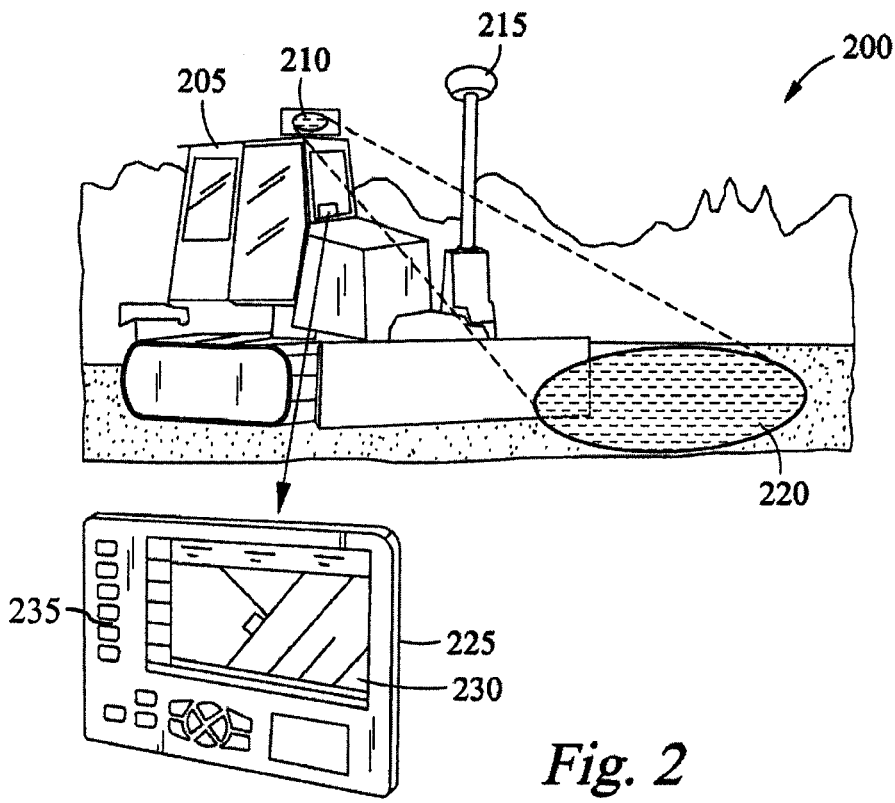
FIG. 2 depicts embodiments of a system according to one or more embodiments of the invention.

Referring now to FIG. 2, a simplified system diagram 200 is shown which may employ the controller of FIG. 1. As shown in FIG. 2, system 200 includes controller 225 (e.g., controller 100) which may be mounted in earthmoving machine 205. In one embodiment, imaging device 210 and GPS receiver 215 may be coupled to earthmoving machine 205. As such, imaging device 210 may be configured to capture visual data of a portion of work site 220 (e.g., video stream or still image data). The portion of the work site 220 may relate to a viewing area of imaging device 210. As shown in FIG. 1, the portion of the work site 220 is shown as the anterior portion of earthmoving machine 205. However, it should also be appreciated that the imaging device 210 may be configured to capture a visual image related to any direction of earthmoving machine 205. According to one embodiment, imaging device 210 may be configured to capture a panoramic image. GPS receiver 215 may be configured to determine a spatial location and/or orientation of earthmoving machine 205. According to another embodiment, controller 225 may be coupled to imaging device 210 and GPS receiver 215 by either a wireless or wired communication link. In that fashion, controller 225 may be configured to present a visual image of the portion of the work site 220.

Further, controller 225 may be configured to present design and topographical data on display 230 (e.g., display 125). For example, a target design surface for the work site may be displayed, as will be described in more detail below with respect to FIGS. 6A-6B. In one embodiment, display 230 may be a liquid crystal display (LCD). It may also be appreciated that other types of displays may be employed by controller 225. In one embodiment, controller 225 may include at least one terminal 235 which may be employed by a user to adjust display 230.

Figure 3:
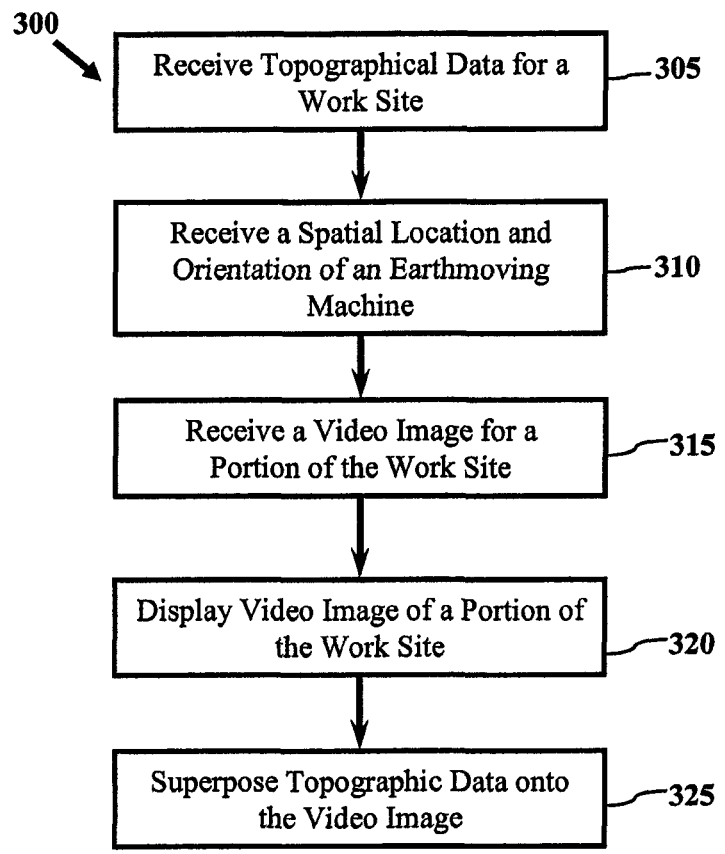
FIG. 3 depicts a process according to one or more embodiments of the invention.

Referring now to FIG. 3, process 300 is shown for displaying topographical data according to one or more embodiments of the invention. Process 300 may be initiated by receiving design and/or topographical data for a work site (e.g., worksite 220) at block 305. Design data received at block 305 may include a target elevation and/or grade for a work site. Similarly, topographical data received at block 305 may relate to cut and/or fill data for the work site. The spatial position and/or orientation of an earthmoving machine (e.g., earthmoving machine 205) may be received at block 310. Process 300 may include receiving a visual image of a work site at block 315. In one embodiment, the visual image may be one of a visual stream or one ore more still digital images. Visual data received in block 315 may correlate to a portion of a work site. Design or topographical data, received in block 315 may be superposed on the visual image in block 320. In one embodiment, superposing of a target design surface in block 320 may include using at least one of a fiducial marker or reference mark. According to another embodiment, design data presented by process 300 may be updated as will be described below in more detail with reference to FIG. 5.

Figure 4:
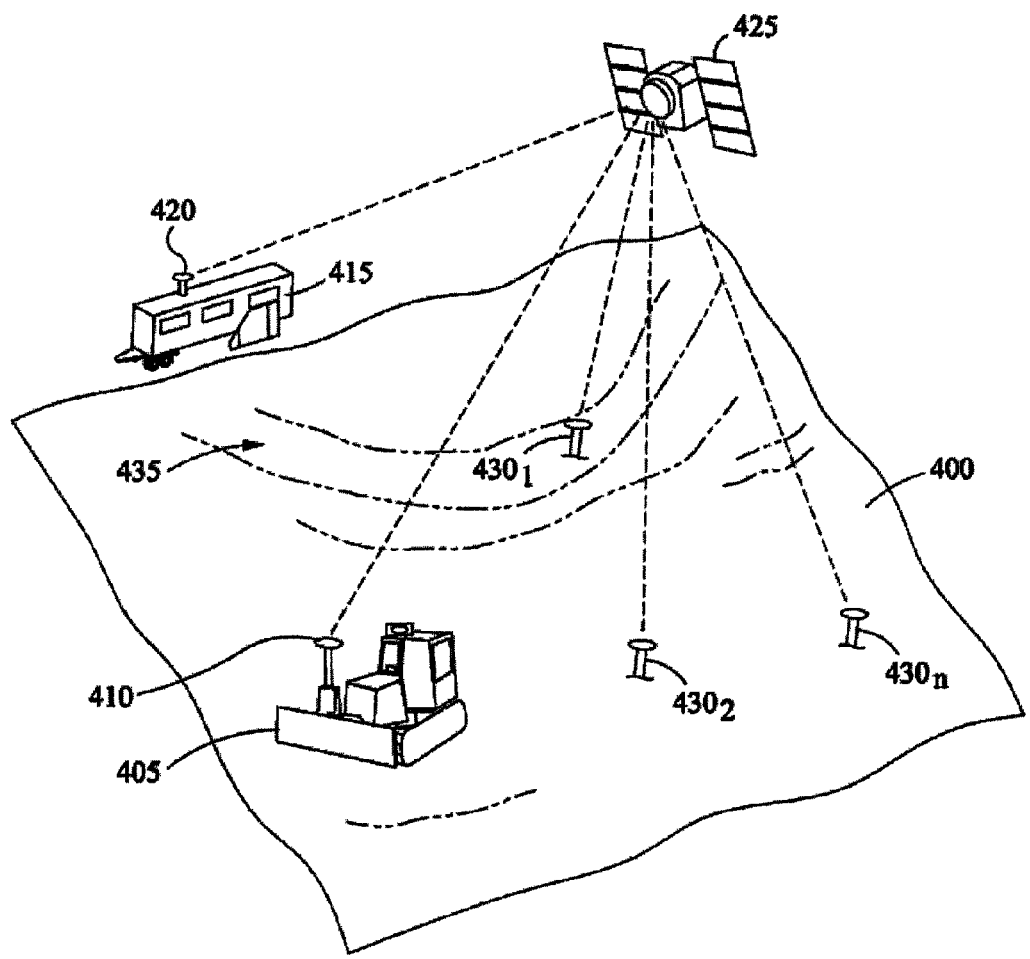
FIG. 4 depicts a graphical representation of a work site according to one embodiment of the invention.

FIG. 4 depicts a simplified graphical representation of a work site 400 in which the system of FIG. 2 may be employed. In one embodiment, work site 400 may be a predefined area having at least one boundary. As shown in FIG. 4, work site 400 conforms to a rectangular shape in general. However, it should be appreciated that the work site 400 may conform to other shapes. Earthmoving machine 405 (e.g., earthmoving machine 205) may be configured to receive spatial positioning and orientation data using GPS receiver 410. In one embodiment, earthmoving machine 405 may receive spatial positioning data and orientation from a GPS satellite 425 via GPS receiver 410. Based, at least in part, on one or more signals received by GPS receiver 410, a controller (e.g., controller 225) coupled to earthmoving machine 405 can present design and/or topographical data related to work site 400 to an operator of the machine. According to another embodiment, earthmoving machine 405 can receive topographical data via an I/O interface (e.g., I/O interface 130) of control station 415. Further, control center 415 can collect topographical reference data from one or more of a plurality of reference markers $430_1$-$430_n$ such as, a grade, indicated by 435, of the work site.

Figure 5:
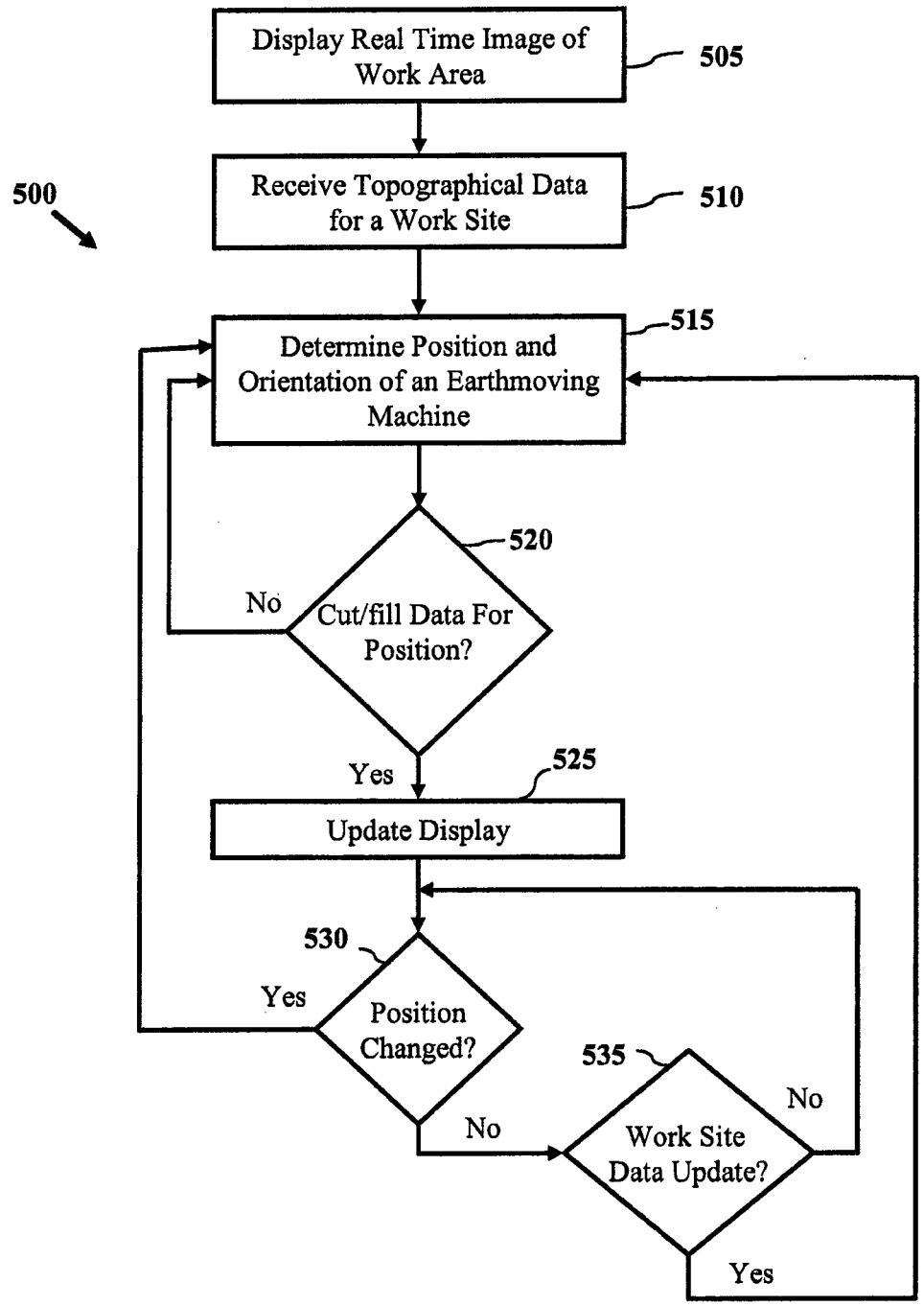
FIG. 5 depicts a process according to one or more embodiments of the invention.

Referring now to FIG. 5, process 500 is shown for presenting topographical data for a work site according to one embodiment of the invention. Process 500 may be initiated by displaying a real time image of a work site in block 505. The real time image may be captured from an imaging device (e.g., imaging device 210) mounted to an earthmoving machine (e.g., imaging device 205). Design and topographical data for the work site may be received in block 510. In block 515, a position and/or orientation of the earth moving machine may be determined. For example, a GPS receiver (e.g., GPS receiver 215) may be configured to determine the spatial location and orientation of the machine. It may also be appreciated that a controller (e.g., controller 225) may be configured to determine an orientation of the earthmoving machine.

Process 500 may further include determining if cut and/or fill data exists or can be calculated for the current position and/or orientation of the machine. According to one embodiment of the invention, cut fill data may be received by a controller (e.g., controller 215) mounted in the earth moving machine. The cut/fill data may relate to data indicating at least one of a desired elevation and grade of the work site as displayed to an operator of the earthmoving machine. In another embodiment, cut/fill data may be determined by the controller from the design surface and/or the most recent topographical surface data available to the controller. When design data does not exist for the current spatial position of the earthmoving machine (e.g., "No" path out of block 520), the position and orientation of the earthmoving machine can be monitored as described in block 515. However, when topographical data does exist for the current spatial position of the earthmoving machine (e.g., "Yes" path out of block 520), a display (e.g., display 230) presenting a portion of the work site may be updated as shown in block 525. In one embodiment, a target design surface may be superposed on the real time image of the work site. As such, an operator of the earthmoving machine can be provided with the desired design data while operating the earthmoving machine.

Continuing to refer to FIG. 5, process 500 may include determining if a position and/or orientation of the earth moving machine is modified at block 530. When the position or orientation of the earthmoving machine has changed (e.g., "Yes" path out of block 530), the position and orientation of the earthmoving machine can be determined by controller (e.g., controller 225) as shown in block 515. However, when the position or orientation of the earthmoving machine has not changed (e.g., "No" path out of block 530), a controller can determine if design and/or topographical data for the work site has been updated at block 535. When the design and/or topographical data for the work site has been updated (e.g., "Yes" path out of block 535), the position and orientation of the earthmoving machine can be determined as described in block 515. However, when the design and/or topographical data for the work site has not been updated (e.g., "No" path out of block 535), controller may be configured to monitor position of the earthmoving machine as described in block 515. According to another embodiment of the invention, it may be appreciated that an operator of the earth moving machine may employ input terminals (e.g., terminals 235) of a controller to update at least one of the visual image and topographical data of the work site.

Figure 6A:
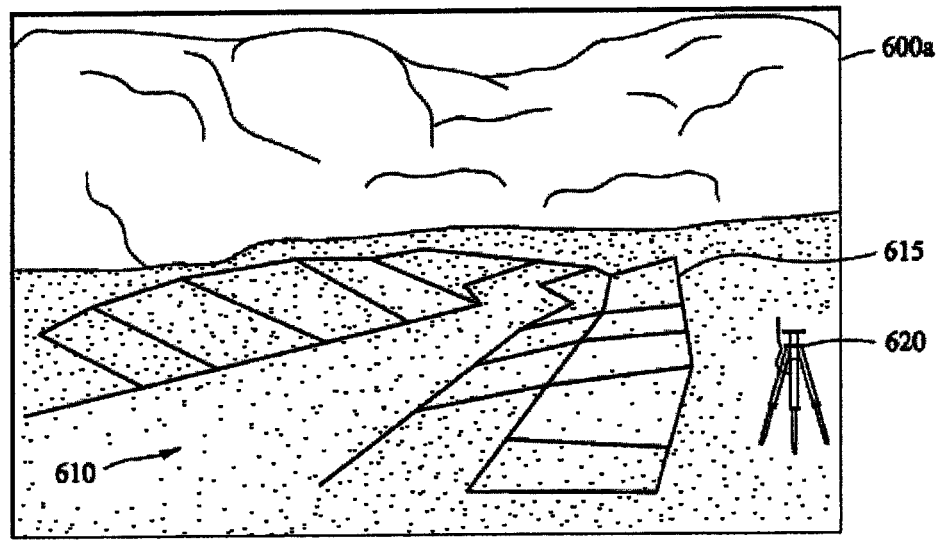
FIGS. 6A-6B depict a graphical representation of a display according to one or more embodiments of the invention.
Figure 6B:
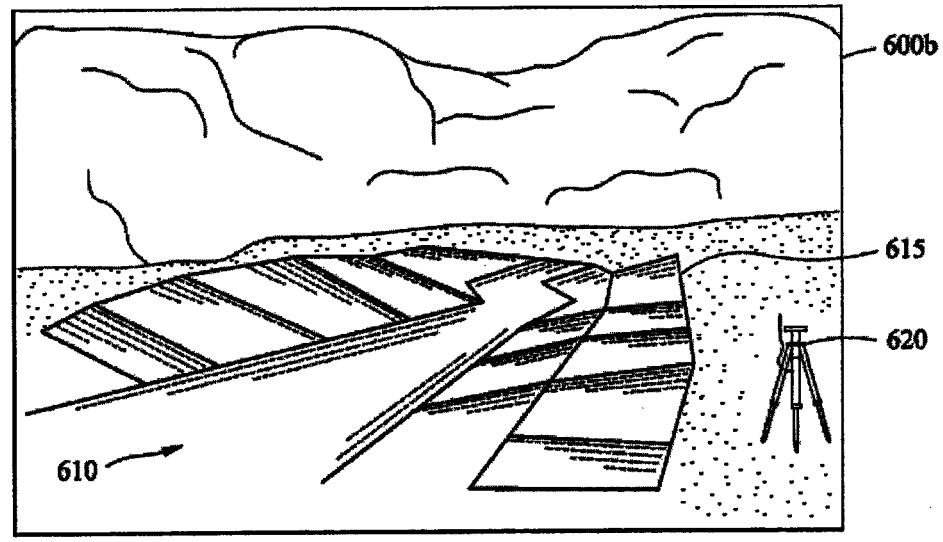

Referring now to FIGS. 6A-6B, exemplary views are shown of a display windows 600a and 600b (e.g., display window 230) according to one or more embodiments of the invention. Referring first to FIG. 6A, display window 600a presents a real time image of at least a portion of a work site 610, according to one embodiment of the invention. It may be appreciated that a target design surface 615 may be superposed on the visual image of the work site 610. As shown in FIG. 6a, the target design surface 615 may be presented as lines indicating at least one of a desired elevation and grade for the portion of the work site. It may also be appreciated that target design surface 615 may be presented as shaded, colored or patterned regions. In certain embodiments, display window 600a may relate to a portion of work site 610 (e.g., portion of a work site 220) in the vicinity of an earthmoving machine. According to another embodiment, GPS reference stations 620 may be employed as reference markers for the display window. For example, a controller (e.g., controller 225) may be configured to employ a GPS reference station 620 for aligning a target design surface with visual image of work site 610. In that fashion, the visual image of work site 610 presented in display window 600a may be aligned with the design surface 615. In one embodiment, alignment of the visual image of the work site 610 and target design surface 615 may be determined using position and/or orientation data collected from one of angle sensors, inertial sensors, GNSS receivers and positioning devices in general. In yet another embodiment, display window 600a may relate to an eyepiece worn by an operator of the earthmoving machine.

Referring now to FIG. 6B, display window 600b is shown representing a visual image of a portion of work site 610 conforming to a design surface 615. It may also be appreciated that target design surface 615 may be displayed as a second color when the target elevation or grade of the work site 610 is achieved. In that fashion, operators of the earthmoving machine may be provided with an indication that a target grade or elevation is achieved.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for presenting a visual image of a work site for an earthmoving operation, the method comprising the acts of:
   receiving target design data for the work site;
   receiving a spatial location and orientation for an earthmoving machine operating in relation to the work site;
   receiving a visual image of at least a portion of the work site from an imaging device mounted to the earthmoving machine; and
   displaying the visual image of the portion of the work site with a target design profile overlaying the visual image, the target design profile based on a subset of the design data overlaying the visual image, wherein the subset of the design data includes a target design surface for the portion of the work site with data indicating a desired elevation and grade of the worksite for display.

2. The method of claim 1, wherein the target design surface corresponds to at least one of position data, elevation data, grade data, cut/fill data and a spatial reference mark for the work site.

3. The method of claim 1, wherein the spatial location data comprises at least one of global navigation satellite system (GNSS) data, global positioning system (GPS) data and geospatial positioning data in general.

4. The method of claim 1, wherein displaying the visual image further comprises updating the subset of the target design data based on at least one of a change in position and a change in orientation of the earthmoving machine.

5. The method of claim 1, wherein displaying the visual image further comprises updating the subset of the target design data based on a change in a topographical characteristic of the work site.

6. The method of claim 1, wherein displaying the visual image further comprises displaying the subset of the design data as at least one of color shading and tinting the visual image.

7. The method of claim 1, further comprising adjusting the display of the visual image of the work site based, at least in part, on a received user input.

8. The method of claim 7, wherein adjusting the display of the visual image comprises at least one of increasing, decreasing, horizontally positioning and vertically positioning a viewing angle of the portion of the work site.

9. The method of claim 1, further comprising adjusting the display of the subset of the design data based, at least in part, on transverse, longitudinal and vertical rotation.

10. An operator interface for presenting a visual image of a work site for an earthmoving machine, the interface comprising:
    a display;
    at least one input configured to receive
    target design data for the work site,
    a spatial location and orientation for an earthmoving machine operating in relation to the work site, and
    a visual image of at least a portion of the work site from an imaging device mounted to the earthmoving machine; and
    a processor coupled to the at least one input and the display, the processor configured to:
        output data received by the at least one input to the display such that a visual image of the portion of the work site is displayed with a target design profile overlaying the visual image, and
        the target design profile based on a subset of the design data is displayed overlaying the visual image, wherein the subset of the design data includes a target design surface for the portion of the work site with data indicating a desired elevation and grade of the worksite for display.

11. The operator interface of claim 10, wherein the target design surface corresponds to at least one of position data, elevation data, grade data, cut/fill data and a spatial reference mark for the work site.

12. The operator interface of claim 10, wherein the spatial location data comprises at least one of global navigation satellite system (GNSS) data, global positioning system (GPS) data, ground based radio positioning data and geospatial positioning data in general.

13. The operator interface of claim 10, wherein the processor is further configured to update the subset of the target design data based on at least one of a change in position and a change in orientation of the earthmoving machine.

14. The operator interface of claim 10, wherein the processor is further configured to update the subset of the target design data based on a change in a topographical characteristic of the work site.

15. The operator interface of claim 10, wherein displaying the visual image further comprises displaying the subset of the target design data as at least one of color shading and tinting the visual image.

16. The operator interface of claim 10, processor is further configured to adjust the display of the visual image of the work site based, at least in part, on a received user input.

17. The operator interface of claim 16, wherein adjusting the display of the visual image comprises at least one of increasing, decreasing, horizontally positioning and vertically positioning a viewing angle of the portion of the work site.

18. The operator interface of claim 10, wherein the processor is further configured to adjust the display of the subset of the design data based, at least in part, on transverse, longitudinal and vertical rotation of the earthmoving machine.

* * * * *